Patented Nov. 14, 1944

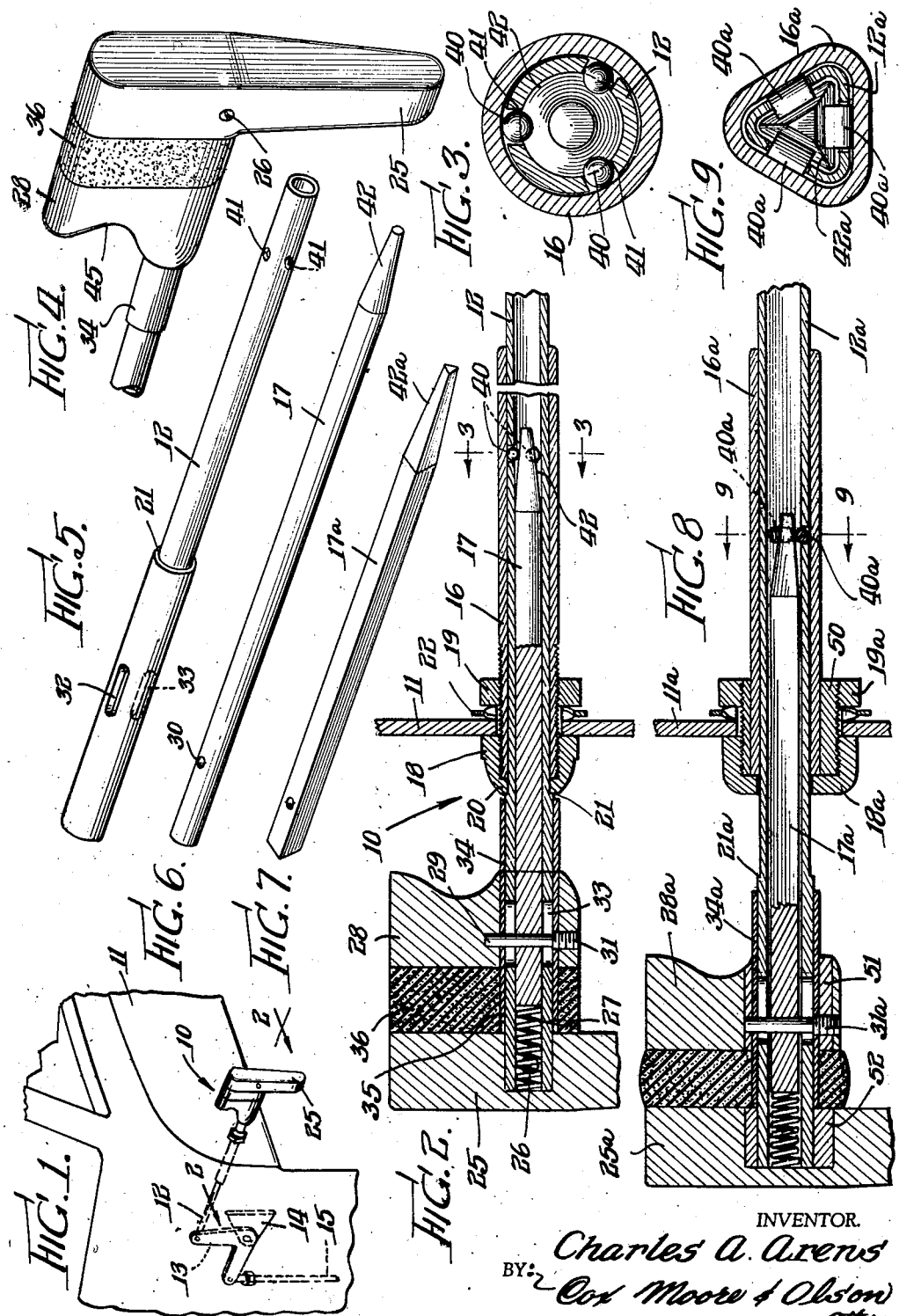

2,362,458

UNITED STATES PATENT OFFICE 2,362,458

CONTROL MECHANISM

Charles A. Arens, Chicago, Ill., assignor to Arens Controls, Inc., Chicago, Ill., a corporation of Illinois Application May 3, 1941, Serial No. 391,631

12 Claims. (Cl. 74—503)

This invention relates to control mechanisms, particularly of the type adapted to releasably retain the control in a plurality of adjusted positions.

It is an object of the invention to provide a new and improved control mechanism, and more specifically to provide a new and improved locking or holding mechanism in association therewith whereby to enable the control to releasably retain the mechanism or device to be controlled in a plurality of adjusted positions.

A further object of the invention is to provide a new and improved parking brake structure, for automotive use and the like.

Still further objects of the invention are to provide, in a device of the type defined and having movements in opposite directions, an improved locking or holding structure of increased holding effectiveness, and adaptable to impact predetermined controlled degrees of resistance to movement both outwardly and inwardly; and further to provide an improved handle and release structure in association therewith.

Various other objects, advantages and features of the invention will appear from the following specification when taken in connection with the accompanying drawing, wherein certain preferred embodiments are set forth for purposes of illustration.

In the drawing, wherein like reference numerals refer to like parts throughout:

Fig. 1 is a general assembly view, in partial perspective, of a parking brake structure, or control mechanism, constructed in accordance with the principles of the invention;

Fig. 2 is a longitudinal sectional view of a part of the device of Fig. 1, on an enlarged scale and on the line 2—2 of Fig. 1;

Fig. 3 is a transverse sectional view through the mechanism of Fig. 2, on a further enlarged scale and on the line 3—3 thereof;

Fig. 4 is a perspective detail view of the handle structure;

Figs. 5 and 6 are detail perspective views, respectively, of the operating sleeve and the locking or holding mechanism control shaft;

Fig. 7 is a view of the control shaft as adapted for use with a modified form of structure;

Fig. 8 is a longitudinal sectional view, similar to Fig. 2, but illustrating a modified embodiment of the invention and incorporating the control shaft of Fig. 7; and Fig. 9 is a transverse sectional view of the mechanism of Fig. 8, on an enlarged scale and on the line 9—9 thereof.

In the drawing, the invention has been shown incorporated in a parking brake construction for automotive use, or the like, as certain features of the invention, and certain aspects thereof, are particularly adapted for such a structure and use. It is to be understood, however, that the invention in other of its features and aspects may be adapted for use with control mechanisms generally, and particularly to control mechanisms adapted to releasably retain an operated device or mechanism in a plurality of adjusted positions.

Referring more particularly to the drawing, and first to the embodiment set forth in Figs. 1 to 6 inclusive, it will be seen that the mechanism illustrated comprises a parking brake structure adapted for automotive use or the like. More specifically the control mechanism, generally indicated by the numeral 10, is carried upon the dashboard 11 of the automotive vehicle, for example in the upper lefthand corner thereof, as illustrated in Fig. 1. The operating member or sleeve 12 of the control mechanism is pivotally connected to one arm of a bell-crank lever 13 pivotally mounted upon a frame bracket 14, the other arm of the bell-crank being connected to a brake control rod or the like 15. It will be understood that as the operating member 12 is adjusted inwardly or outwardly, the bell-crank 13 and associated control rod 15 will be operated to control the brake. More specifically, an outward movement of the operating member, to the right as seen in Fig. 1, applies the brake, whereas an inward movement of the member to the left effects the brake release.

The detailed construction of the control mechanism, and the manner of operation of the member 12, will be best understood by reference to Figs. 2 and 3, and taken also with the detail views, Figs. 4, 5 and 6. The control mechanism in general comprises the operating sleeve 12, a housing or frame sleeve 16 within which the sleeve 12 is longitudinally reciprocable, and a control shaft 17 associated with and adapted to control the locking or holding means. The frame sleeve 16 is rigidly secured to the dashboard 11 by means of cooperating clamping nuts 18 and 19 screw threaded to the sleeve and adapted to be clamped against the opposite faces of the dashboard. The nut 18 is provided with an inwardly extending annular flange 20 which engages the end of the sleeve 16, and also acts as an abutment for limiting the inward or forward movement of the operating sleeve 12 by reason of its engagement with a shoulder 21, Fig. 5, formed on the sleeve. A lock washer or the like 22 may be interposed between the nut 19 and the dashboard, as shown.

A handle member 25 is secured to the end of the operating sleeve 12 by any suitable means, such as set screws or the like as indicated at 26, a compression spring 27 being arranged within the handle and bearing at one end against the handle body and at the other end against the end of the control shaft 17. By means of the handle 25 the operating sleeve 12 may be longitudinally reciprocated within the frame sleeve 16, or moved to any desired longitudinal position.

While the control shaft 17 moves generally with the operating sleeve 12, it is adapted to be shifted slightly longitudinally with respect thereto to effect the operation of the locking or holding mechanism; and to enable this shifting of the control shaft relative to the sleeve 12, the shaft is provided with a handle member 28 rigidly secured to the shaft by means of a pin 29. This pin engages at its mid-section with an opening 30, Fig. 6, formed in the control shaft, the outer ends of the pin, one of which is threaded as indicated at 31, having engagement with the handle body. The operating sleeve 12, as best shown in Fig. 5, is provided with diametrically disposed elongated slots 32 and 33 adapted to receive the pin. A sleeve 34 is press-fitted into the handle member 28, so as to in effect form an integral part thereof. The outer end 35 of this sleeve is adapted to engage the handle member 25, to serve as a limiting means for movement of the control rod 17 relative to the operating sleeve 12 in an outward direction. A compressible filler member 36, such as a piece of sponge rubber, or the like, fills the space between the handle members 25 and 28.

The locking or holding elements cooperable with the control rod 17 comprise a series of three ball members 40, Figs. 2 and 3, arranged within corresponding openings 41 formed in the sleeve 12, the balls being engageable on their inner peripheries with a conical tapered surface 42 formed on the end of the control rod, and on their outer peripheries with the internal wall surface of the frame sleeve 16. As the control rod is urged inwardly or to the right, as seen in Fig. 2, by the spring 27, the cam surface 42 urges the balls into gripping engagement against the surface of the sleeve 16.

In operation, normally the compression spring 27, augmented slightly by the resilient compressibility of the sponge rubber member 36, urges the control shaft 17 to the right as seen in Fig. 2, thereby camming the balls 40 outwardly into gripping engagement with the frame sleeve 16. By reason of the fact that the balls are engaged within the openings 41 of the operating sleeve 12, the operating sleeve is thus held or constrained from movement. However, the particular type of holding mechanism provided gives a very much greater holding resistance to movement in one direction than the other; and due to the fact that the taper 42 on the end of the control rod progresses inwardly away from the rod body, the stronger holding action is provided resistant to inward movement of the operating sleeve 12, to the right as seen in Fig. 2. More particularly, if the sleeve 12 is pulled outwardly by means of the handle 25, it will be seen that such action tends to roll the balls 40 along the surface of the sleeve 16 in such a manner that they tend to roll down the tapered surface 42, diminishing the holding action. On the other hand, if the operating sleeve 12 is pushed inwardly, or to the right as seen in Fig. 2, such action tends to roll the balls up the surface 42 into increased holding effectiveness. By properly determining the strength of the compression spring 27 and properly proportioning the parts, a positive lock may be obtained, resistant to movement of the operating sleeve in an inward direction, while at the same time leaving the sleeve relatively free to be pulled outwardly, against or overcoming relatively light frictional resistance. In other words, the parking brake may be pulled outwardly, as seen in Fig. 1, to apply the brake at any time merely by gripping and pulling upon the handle 25, without release of the locking balls. The operating member 12 will, however, be prevented from inward or retrograde movement, to release the brake, a substantially positive locking action being provided against inward movement.

Not only is a positive lock against inward movement provided, but the locking action is instantaneous and present at all times by reason of the maintained engagement of the balls 40 in active holding position. Accordingly the operating sleeve will be held in any outward position to which it may be pulled, without even partial retrograde motion such as generally takes place in the operation of ratchet type mechanisms. It is to be understood that the angularity of the taper 42 and the compressive forces of the spring 27 cooperatively determine the degree of holding force which will be obtained resistant to both inward and outward movement of the operating sleeve when the holding balls are in operative position. These variables may be controlled to meet the requirements for any particular installation, producing, as has heretofore been stated, a holding action tantamount to a positive lock against inward movement, if this is desired, as in a parking brake installation or the like.

To effect the release of the holding means, whereby to permit the inward motion of the operating sleeve, the handle member 28 is moved relatively toward the handle member 25, effecting the outward movement of the control rod 17 and the release of the holding balls. Referring to Fig. 4, it will be seen that the handle member 28 constitutes in effect an auxiliary handle or release trigger with respect to the main handle 25, the operation of which enables the release of the brake mechanism. The two handles, when taken together with the filler piece 36, constitute a pistol grip handle structure, the auxiliary handle or release trigger 28 being operable by the operator's forefinger. To this end it will be noted that the inner surface of the handle member 28 is shaped, as indicated at 45 to conform to the curvature of the finger. The filler piece 36 not only prevents any part of the operator's hand from becoming pinched between the handle members 25 and 28, but also provides sufficient thickness to the handle structure so as to enable the relatively movable hand pieces to be readily squeezed or gripped together. The sleeve member 34 provides protection for the operator's hand from being caught between the auxiliary hand piece 28 and the surface of the operating sleeve 12. The downwardly extending portion of the main handle member 25 provides a firm grip for pulling the control mechanism outwardly, as to apply the brake.

Upon release of the holding balls, the operating sleeve 12 may be readily moved inwardly until the limiting shoulder 21 engages the nut flange 20.

Referring particularly to Fig. 3, it will be noted that three locking or holding balls 40 are provided. By reason of this arrangement the locking balls automatically center the control rod 17 so as to insure a substantially uniform application of holding pressure by the three balls.

In Figs. 7, 8 and 9 an embodiment of the invention is illustrated, generally similar to that previously described, but wherein increased contacting areas are provided between the locking or holding elements and their associated engagement surfaces. More particularly in this instance the holding elements 40a constitute rollers, as shown in Fig. 9, and the sleeves 16a and 12a and the control rod 17a are of triangular configuration. The provision of the roller type holding mechanism may be desirable, particularly in instances where increased operating pressures are necessary, to prevent imbedding or undue pressure engagement at the points of contact between the elements 40a and their associated engagement surfaces. The operation of the embodiment illustrated in Figs. 7, 8 and 9 is believed to be clear from what has heretofore been set forth in reference to Figs. 1 to 6 inclusive. In Fig. 8 the handle structure is illustrated in compressed or release position, as distinguished from a locking position, as illustrated by Fig. 2. To enable the mounting of the nuts 18a and 19a upon the triangular sleeve 16, an adapter ring 50 having a threaded circular outer surface and a triangular inner surface may be press-fitted onto the sleeve. Similar adapters 51 and 52 may be employed to mount the triangular sleeves 12a and 34a within the handle members.

It is obvious that various changes may be made in the specific embodiments set forth for purposes of illustration without departing from the spirit of the invention. Accordingly the invention is not to be limited to the precise embodiments shown and described, but only as indicated in the following claims.

The invention is hereby claimed as follows:

1. A control mechanism comprising a frame member adapted to be secured to a support, an elongated operating member axially shiftable within the frame member and adapted to be connected to a device to be controlled, and holding means for releasably holding the operating member from movement with respect to the frame member, said holding means comprising a shiftable control member shiftable within the frame member and having an inclined cam surface, a holding element shiftable along and controlled by said surface, said holding element being of increased holding effectiveness upon an outward movement thereof, and a handle secured to the control member for effecting the shifting thereof, said cam surface being of decreased effectiveness in a direction extending away from said handle.

2. A control mechanism comprising a frame sleeve adapted to be secured to a support, an operating sleeve shiftable within the frame sleeve and adapted to be connected to a device to be controlled, and holding means for releasably holding the operating sleeve for movement with respect to the frame sleeve, said holding means comprising a control rod shiftable within the operating sleeve and having an inclined cam surface, a holding element shiftable along and controlled by said surface, said holding element being of increased holding effectiveness upon an outward movement thereof, and a handle secured to the control rod for effecting the shifting thereof, said cam surface being of decreased effectiveness in a direction extending away from said handle.

3. A control mechanism comprising a frame sleeve adapted to be secured to a support, an operating sleeve shiftable within the frame sleeve and adapted to be connectd to a device to be controlled, said operating sleeve being provided with a plurality of perforations extending therethrough, and holding means for releasably holding the operating sleeve from movement with respect to the frame sleeve, said holding means comprising a control rod shiftable within the operating sleeve and having a conically-shaped cam surface secured on one end thereof, a plurality of holding elements arranged within the operating sleeve perforations, said holding elements being engageable by said conical cam surface and thrust thereby into engagement with the interior surface of the frame sleeve, and a handle secured to the control rod for effecting the shifting thereof, said conical cam surface being of decreased effectiveness in a direction extending away from said handle.

4. A control mechanism comprising a frame member adapted to be secured to a support, an operating sleeve shiftable relative to the frame member and adapted to be connected to a device to be controlled, and holding means for releasably holding the operating sleeve from movement with respect to the frame member, said holding means comprising a control shaft shiftable within the operating sleeve and having an inclined cam surface, a holding element controlled by said surface, a handle secured to said operating sleeve to effect the shifting thereof, a juxtaposed handle for effecting the shifting of the control shaft, and means extending through the operating sleeve for securing said last named handle to the control shaft, said cam surface being of decreased effectiveness in a direction extending away from said handles.

5. A control mechanism comprising a frame member adapted to be secured to a support, an elongated operating member axially shiftable relative to the frame member and adapted to be connected to a device to be controlled, said operating member having a handle connecting portion adjacent one end thereof, a handle secured to the handle connecting portion of the operating member for effecting the shifting thereof, and holding means for releasably holding the operating member from movement with respect to the frame member, said holding means comprising an elongated axially shiftable control member, an inclined cam surface, and a holding element controlled by said surface, said control member having a handle connecting portion adjacent one end thereof, a handle secured to the handle connecting portion of the control member for effecting its shifting, said control member handle being juxtaposed to the operating member handle, and the handle connecting portion of the control member being projected through the handle end portion of the operating member, and said control member handle being shiftable toward the operating member handle to effect the release of said holding element.

6. A control mechanism as defined in claim 5 wherein the operating member handle is of greater extent transversely of the operating member axis than the control member handle, whereby the latter overlies a portion only of the surface of the operating member handle.

7. A control mechanism as defined in claim 5 wherein the operating member handle is of greater extent transversely of the operating member axis than the control member handle, and wherein a resilient filler element is arranged between said handles whereby to form a pistol grip structure.

8. A control mechanism comprising an elongated sleeve-like frame member adapted to be secured to a support, a pair of elongated operating members disposed within the frame member and axially shiftable in respect thereto, said operating members also being axially shiftable relative to each other through a predetermined distance, handles secured to each of said operating members adjacent one end thereof, said handles being in juxtaposition and being shiftable relative to each other to effect the relative shifting of the operating members, control means for locking the operating members to the frame member, said control means comprising an inclined cam surface formed on one of said operating members, said operating members in the vicinity of said cam surface being shaped to provide bearing engagement between the operating members and with the sleeve-like frame member, and a holding element shiftable along said surface and adapted to be brought into gripping engagement with the frame member, and a member to be controlled connected to one of said operating members, said cam surface being of decreased effectiveness in a direction extending away from said handles.

9. A control mechanism comprising an elongated sleeve-like frame member adapted to be secured to a support, a pair of elongated operating members disposed within the frame member and axially shiftable in respect thereto, each of said operating members having handle connecting portions adjacent one end thereof, said operating members also being axially shiftable relative to each other through a predetermined distance, handles secured to the handle connecting portions of said operating members, said handles being in juxtaposition and being shiftable relative to each other to effect the relative shifting of the operating members, control means for locking the operating members to the frame member, said control means comprising an inclined cam surface connected with one of said operating members, and a holding element shiftable along said surface and adapted to be brought into gripping engagement with the frame member, and a member to be controlled connected to one of said operating members, the handle connecting portion of one of the operating members extending through the handle end portion of the other operating member, said handles being shiftable relatively toward each other to effect the release of said control means.

10. A control mechanism comprising an enlongated frame member adapted to be secured to a support, a pair of elongated operating members disposed within the frame member and axially shiftable in respect thereto, said operating members also being axially shiftable relative to each other through a predetermined distance, handles secured to each of said operating members adjacent one end thereof, said handles being in juxtaposition and being shiftable relative to each other to effect the relative shifting of the operating members, control means for locking the operating members to the frame member, said control means comprising an inclined cam surface formed on one of said operating members, said cam surface being formed directly in the body of said last named operating member, and a holding element shiftable along said surface and adapted to be brought into gripping engagement with the frame member, and a member to be controlled connected to one of said operating members, said cam surface being of decreased effectiveness in a direction extending away from said handles.

11. A control mechanism comprising a frame member adapted to be secured to a support, a pair of elongated operating members axially shiftable in respect to and within the frame member, said operating members also being axially shiftable relative to each other through a predetermined distance, holding means for releasably holding the operating members from movement with respect to the frame member, said holding means comprising an inclined cam surface and a holding element shiftable along and controlled by said surface and adapted to be thrust thereby outwardly into engagement with the frame member, handles secured to each of said operating members adjacent one end thereof, said handles being in juxtaposition and being shiftable relatively toward each other to decrease the holding effectiveness of said holding means, said cam surface being of decreased effectiveness in a direction extending away from said handles, and a filler block of resilient material disposed between said handle members and forming a bridging structure therebetween.

12. A control mechanism as defined in claim 10 wherein said operating member handles are shiftable toward each other to decrease the holding effectiveness of the holding element.

CHARLES A. ARENS.